May 23, 1933.  R. S. RICHARDSON  1,910,365
METHOD FOR EFFECTING CATALYTIC EXOTHERMIC GASEOUS REACTIONS
Filed July 24, 1931
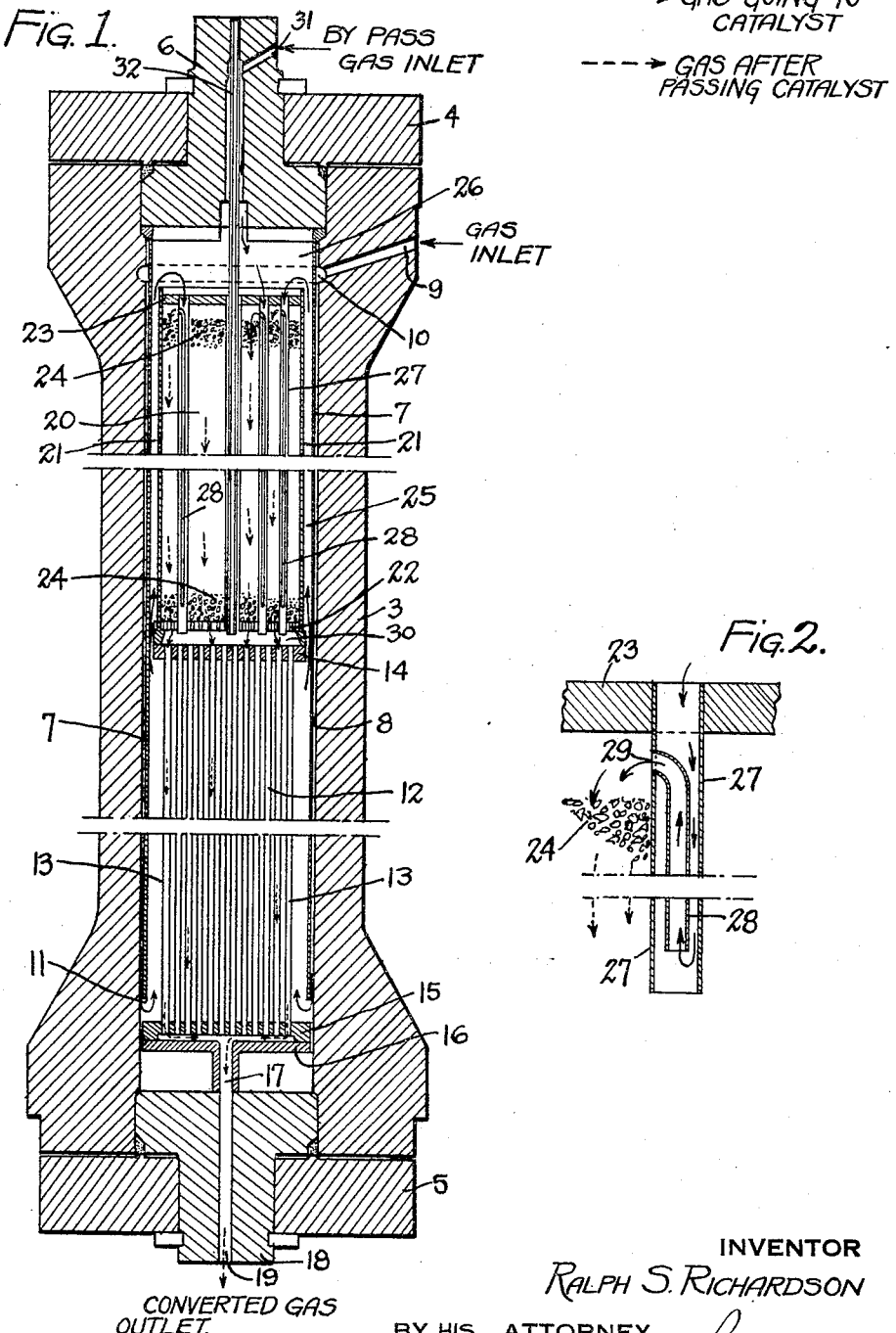
INVENTOR
RALPH S. RICHARDSON
BY HIS ATTORNEY Patented May 23, 1933

1,910,365

UNITED STATES PATENT OFFICE

RALPH S. RICHARDSON, OF TEANECK, NEW JERSEY, ASSIGNOR TO CHEMICAL ENGINEERING CORPORATION, OF NEW YORK, N. Y., A CORPORATION OF DELAWARE

METHOD FOR EFFECTING CATALYTIC EXOTHERMIC GASEOUS REACTIONS

Application filed July 24, 1931. Serial No. 552,875.

My invention relates to an improved method for carrying out high temperature exothermic gas reactions, and applies particularly to those exothermic gas reactions which are conducted under elevated pressures and temperatures such as the synthesis of ammonia from its elements and the synthesis of methanol from hydrogen and carbon monoxide.

I have discovered that such reactions can be carried out to advantage if the gas entering the pressure bomb is first passed peripherally along the inner surface of the pressure sustaining wall, then through a heat exchanger where it is heated to somewhat higher temperatures by the gaseous products of the reaction, and then is passed peripherally or exteriorly of the catalyst before entering into direct or actual contact with the catalyst.

My improved methods permit of better control of the temperatures developed during the reaction. As will be shown hereafter in describing the apparatus that may be used, the heat evolved in the catalyst mass is prevented from reaching the pressure sustaining wall by the interposition of two insulating gas streams, one of which adjacent to the catalyst has a temperature intermediate between that of the catalyst and that of the colder incoming gas, and the second of which has a temperature approximating that of the incoming gas. This results in maintaining a lower and safer operating temperature in the highly stressed wall of the pressure sustaining vessel.

A further advantage lies in the fact that removal of heat of reaction from the catalyst is accomplished by transfer of heat from the catalyst mass through the wall of the catalyst container or basket into the gas on its way to the catalyst, and due to the fact that the gas on the way to the catalyst has previously been heated in the heat exchanger, this transfer of heat can be advantageously controlled so as to remove part of the reaction heat from the catalyst mass without at the same time cooling the catalyst mass to a temperature at which it would become inactive. My methods therefore prevent undue cooling of the catalyst mass and at the same time accomplish an effective insulation of the pressure sustaining walls from the heat of the reaction.

The accompanying drawing shows in vertical section one form of apparatus adapted for carrying out my improved methods of temperature control in which —

Fig. 1 shows the pressure bomb with enclosed associated parts; and

Fig. 2 is an enlarged detail section showing the arrangement of the telescopic tubes within the catalyst at the upper end of the catalyst basket.

Similar numerals refer to similar parts throughout the two figures.

Referring to Fig. 1 the pressure-sustaining bomb 3 is in hollow cylindrical form closed at each end by the covers 4 and 5. Fitted in the top cover 4 is the plug 6 which supports the cylindrical shell 7 in proximity to the side-walls of the bomb 3 so as to leave the annular space 8 between the shell 7 and sidewalls of the bomb. The gas enters through the inlet 9 into the annular chamber 10 cut in the sidewalls of the bomb 3 and passes downwardly through the annular space 8 and then around the lower rim 11 of the shell 7 upwardly into the heat exchanger 12 formed of a plurality of tubes 13 mounted on the upper plate 14 and lower plate 15.

The lower plate 15 is carried on the plate 16 having the orifice 17 supported on the plug 18 that is fitted in the bottom cover 5, the orifice 17 being in alinement with the converted gas outlet 19 formed in the plug 18.

Supported on the upper plate 14 is the catalyst container or basket 20 comprising the outer cylindrical shell 21, perforated grate 22 and top plate 23 with the catalyst 24 resting on the grate 22. The gases pass upwardly through the heat exchanger 12 and then through the annulus 25 between the shell 7 and the inner concentric shell 21 containing the catalyst 24, and are collected in the chamber 26 formed between the bottom of the plug 6 and the top plate 23.

Mounted on the top plate 23 are a plurality of spaced-apart tubes 27, the lower ends of which are closed and extend downwardly through the perforated grate 22. Telescoped concentrically within the tubes 27 are a like number of smaller tubes 28 mounted at their upper ends in the openings 29 cut in the sidewalls of the tubes 27 and having their lower ends open and extending near the bottoms of their surrounding tubes 27. From the chamber 26 the gases pass downwardly (Fig. 2) through the tubes 27 and then upwardly through the tubes 28 and out of the openings 29 into direct contact with catalyst 23 packed around the tubes 27 and supported on the grate 22. The converted gases after passing through the catalyst 24 are then collected in the chamber 30, and then pass downwardly through the tubes 13, orifice 17 and leave the bomb 3 through gas outlet 19.

To by-pass and control the volume of incoming gas, the by-pass gas inlet 31 is cut in the top plug 6, such inlet 31 leading to the central passage 32 opening into the chamber 26. In the drawing the arrows with solid lines indicate the path of the gas through the bomb 3 until brought into actual contact with the catalyst 24; the arrows with broken lines show the path of the converted gas.

It is to be understood that my improved methods are not to be restricted to that involved in the apparatus shown in the figures. In many cases it is of advantage to use the incoming gases directly before their contact with the catalyst to remove heat from the catalyst by passing the gases through a coil or plurality of tubes embedded in the catalyst. Such heat transfer from the catalyst to the preheated incoming gases is easily arranged according to my methods, for example, by closing the cylinder 21 containing the catalyst 24 with a tightly fitting cover supporting the coil or tubes used for catalyst cooling so that the gases leaving the annulus 25 pass through such tubes before being brought into actual contact with the catalyst 24.

I also wish it to be understood that the invention is not to be confined to the method shown for effecting temperature control, as such method may be varied widely without departing from the nature of the invention and without sacrificing its chief advantages.

I claim as my invention:

1. The method for effecting catalytic exothermic gaseous reactions which comprises conveying the gases entering the reaction vessel along its inner walls, then heating said gases by indirect contact with the products of reaction, then conveying said heated gases exteriorly of the catalyst, and thereafter conveying the gases through the body of catalyst but out of contact therewith, and then delivering the gases to the catalyst.

2. The method for effecting catalytic exothermic gaseous reactions which comprises conveying the gases entering the reaction vessel along its inner walls, then heating said gases by indirect contact with the products of reaction, then conveying said heated gases exteriorly and peripherally of the catalyst, and thereafter conveying the gases through the body of the catalyst but out of contact therewith, and then delivering the gases to the catalyst.

3. The method for effecting catalytic exothermic gaseous reactions which comprises conveying the gases entering the reaction vessel along its inner walls, then heating said gases by indirect contact with the products of reaction, then conveying said heated gases exteriorly of the catalyst, and thereafter conveying the gases through the body of catalyst but out of contact therewith, and then delivering the gases into actual contact with the catalyst.

4. The method for effecting catalytic exothermic gaseous reactions which comprises conveying the gases entering the reaction vessel along its inner walls, then heating said gases by indirect contact with the products of reaction, then conveying said heated gases exteriorly and peripherally of the catalyst, and thereafter conveying the gases through the body of catalyst but out of contact therewith, and then delivering the gases into actual contact with the catalyst.

5. The method for effecting catalytic exothermic gaseous reactions which comprises conveying the gases entering the reaction vessel along its inner walls and peripherally of the catalyst, then heating said gases by indirect contact with the products of reaction, then conveying said heated gases exteriorly of the catalyst, then passing said gases through but not in direct contact with the catalyst, and thereafter conveying the gases through the body of catalyst but out of contact therewith, and then delivering the gases to the catalyst.

6. The method for effecting catalytic exothermic gaseous reactions which comprises conveying the gases entering the reaction vessel along its inner walls and peripherally of the catalyst, then heating said gases by indirect contact with the products of reaction, then conveying said heated gases exteriorly and peripherally of the catalyst, then passing said gases through but not in direct contact with the catalyst, and thereafter conveying the gases through the body of catalyst but out of contact therewith, and then delivering the gases to the catalyst.

7. The method for effecting catalytic exothermic gaseous reactions which comprises conveying the gases entering the reaction vessel along its inner walls and peripherally of the catalyst, then heating said gases by indirect contact with the products of reaction, then conveying said heated gases exteriorly of the catalyst, then passing said gases through but not in direct contact with the catalyst, and thereafter conveying the gases through the body of catalyst but out of contact therewith, and then delivering the gases to the catalyst.

8. The method for effecting catalytic exothermic gaseous reactions which comprises conveying the gases entering the reaction vessel along its inner walls and peripherally of the catalyst, then heating said gases by indirect contact with the products of reaction, then conveying said heated gases exteriorly and peripherally of the catalyst, then passing said gases through but not in direct contact with the catalyst, and thereafter conveying the gases through the body of catalyst but out of contact therewith, and then delivering the gases to the catalyst.

9. The method for effecting catalytic exothermic gaseous reactions which comprises conveying the gases entering the reaction along its inner walls, then passing said gases peripherally of the catalyst, then conveying the gases through but not in direct contact with the catalyst, and thereafter conveying the gases through the body of catalyst but out of contact therewith, and then delivering the gases to the catalyst.

10. The method for effecting catalytic exothermic gaseous reactions which comprises conveying the gases entering the reaction along its inner walls, and peripherally of the catalyst, then passing said gases in an opposite direction and peripherally of the catalyst, then conveying the gases through but not in direct contact with the catalyst, and thereafter conveying the gases through the body of catalyst but out of contact therewith, and then delivering the gases to the catalyst.

11. The method for effecting catalytic exothermic gaseous reactions which comprises conveying the gases entering the reaction along its inner walls, and peripherally of the catalyst, then passing said gases in an opposite direction and peripherally of the catalyst, then conveying the gases through but not in direct contact with the catalyst, and thereafter conveying the gases through the body of catalyst but out of contact therewith, and then delivering the gases into actual contact with the catalyst.

12. The method for effecting catalytic exothermic gaseous reactions which comprises conveying the gases entering the reaction vessel along its inner walls, then reversing the direction of flow of said gases, then heating said gases by indirect contact with the products of reaction, then conveying said heated gases completely exteriorly of all of the catalyst, thereafter changing the direction of flow of said gases and conveying them through the body of the catalyst but out of contact therewith, and then delivering the gases to the catalyst.

RALPH S. RICHARDSON.